US006646844B1

(12) United States Patent
Matthews

(10) Patent No.: US 6,646,844 B1
(45) Date of Patent: Nov. 11, 2003

(54) APPARATUS FOR POWER-ON DISABLE IN A MULTIPLE POWER SUPPLY SYSTEM AND A METHOD THEREFOR

(75) Inventor: Lloyd P. Matthews, Buda, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/461,909

(22) Filed: Dec. 15, 1999

(51) Int. Cl.[7] .............................. H02H 3/26; H03L 7/00
(52) U.S. Cl. .......................................... 361/78; 327/143
(58) Field of Search .......................... 361/78; 327/143, 327/318, 198, 142

(56) References Cited

U.S. PATENT DOCUMENTS

| | | | | |
|---|---|---|---|---|
| 5,446,403 A | * | 8/1995 | Witkowski | 327/143 |
| 5,446,404 A | * | 8/1995 | Badyal et al. | 327/143 |
| 5,519,347 A | * | 5/1996 | Kim | 327/143 |
| 5,780,942 A | * | 7/1998 | Nakajima et al. | 307/141 |
| 5,936,443 A | * | 8/1999 | Yasuda et al. | 327/143 |
| 6,078,201 A | * | 6/2000 | Crotty | 327/143 |
| 6,204,706 B1 | * | 3/2001 | Horvath | 327/198 |
| 6,215,342 B1 | * | 4/2001 | Morrill | 327/143 |

OTHER PUBLICATIONS

Aug. 1998, Maxim INtegrated Products, MAX6305–MAX6316 Data Sheets, pp. 1–6.*

* cited by examiner

Primary Examiner—Gregory J. Toatley, Jr.
Assistant Examiner—Z Kitov

(57) ABSTRACT

A module for controlling an output signal in a system including first and second power supply signals. The module includes a comparator coupled to receive the first power supply signal and a second signal and coupled to provide a control signal. Also included is a pad module coupled to receive the first power supply signal and the control signal and coupled to provide an output signal. The output signal of the pad module is disabled when the control signal has a first value. Various aspects of the present invention may also be realized through a power-on disable module for an apparatus having multiple power supply signals. The power-on disable module includes a controller coupled to receive a plurality of power supply signals and coupled to provide a power-on disable signal depending on a comparison of the power supply signals.

25 Claims, 3 Drawing Sheets

APPARATUS FOR POWER-ON DISABLE IN A MULTIPLE POWER SUPPLY SYSTEM AND A METHOD THEREFOR

BACKGROUND

1. Field of the Invention

The present invention relates to power supplies of a system and, more particularly, to a system such as an embedded system that has multiple power supplies that are synchronized during initialization of the system.

2. Description of the Related Art

In recent years, systems that use microcontrollers have begun to use multiple power supplies to supply power to the microcontroller. The use of multiple power supplies has created problems in the microcontroller circuitry because, by their nature, power supplies are difficult to time in the ramping of the multiple power signals. During the power up sequence of a system, due to the multiple power supplies, the microcontroller is prone to sending erroneous signals to other circuitry of the system.

For example, in the automotive industry, a microcontroller that is powered by multiple power supplies often has output buffers that erroneously drive other devices that are external to the microcontroller such as fuel injectors, relays, etc. To overcome this problem, designers of such automotive systems have been forced to design around the problem created by multiple power supplies on the system board itself. It would be desirable to modify control circuitry to accommodate the multiple power supplies without being forced to design around the multiple power supplies on the system board itself.

Many other problems and disadvantages of the prior art will become apparent to one skilled in the art after comparing such prior art with the present invention as described herein.

BRIEF DESCRIPTION OF THE DRAWINGS

The present invention may be better understood by referencing the accompanying drawings. The use of the same reference symbols in different drawings indicates similar or identical items.

DETAILED DESCRIPTION

The following discussion is intended to provide a detailed description of at least one example of the invention and should not be taken to be limiting of the invention itself. Rather, any number of variations may fall within the scope of the invention which is properly defined in the claims following this description.

A method and apparatus is described herein which provides for disabling portions of a system, circuit, etc. having multiple power supplies. This provides the advantage, for example, that during system power-on or other times when power supply voltage levels may be changing, certain portions of a system may be disabled (e.g., their outputs overridden) to prevent the system from generating erroneous data. During such times, data signals are often undetermined and can therefore be disabled in accordance with the description herein. For example, in one embodiment, a power-on disable module for an apparatus having multiple power supply signals includes a controller coupled to receive a plurality of power supply signals and coupled to provide an enable override signal depending on a comparison of the power supply signals.

In another embodiment, a module for controlling an output signal in a system including first and second power supply signals includes a comparator and a pad module. The comparator is coupled to receive and compare the first power supply signal and a second signal. The comparator is also coupled to provide a control signal responsive to receiving the first power supply signal and the second signal. The pad module is coupled to receive the first power supply signal and the control signal. The pad module is also coupled to provide an output signal responsive to receiving the first power supply signal. The output signal of the pad module is disabled when the control signal has a first value.

In another embodiment, a data processing system includes first and second power supply signals and a controller. The controller is coupled to receive the first and second power supply signals. The controller is also coupled to provide a control signal depending on a value of the first power supply signal in relation to a value of the second power supply signal.

In another embodiment, a circuit for controlling an output signal includes a control circuit which is coupled to receive a first power supply signal and a power-on reset signal. The power-on reset signal is derived from a second power supply signal. The control circuit is coupled to provide a control signal depending on a comparison of the first power supply signal and the power-on reset signal.

Figure 1:
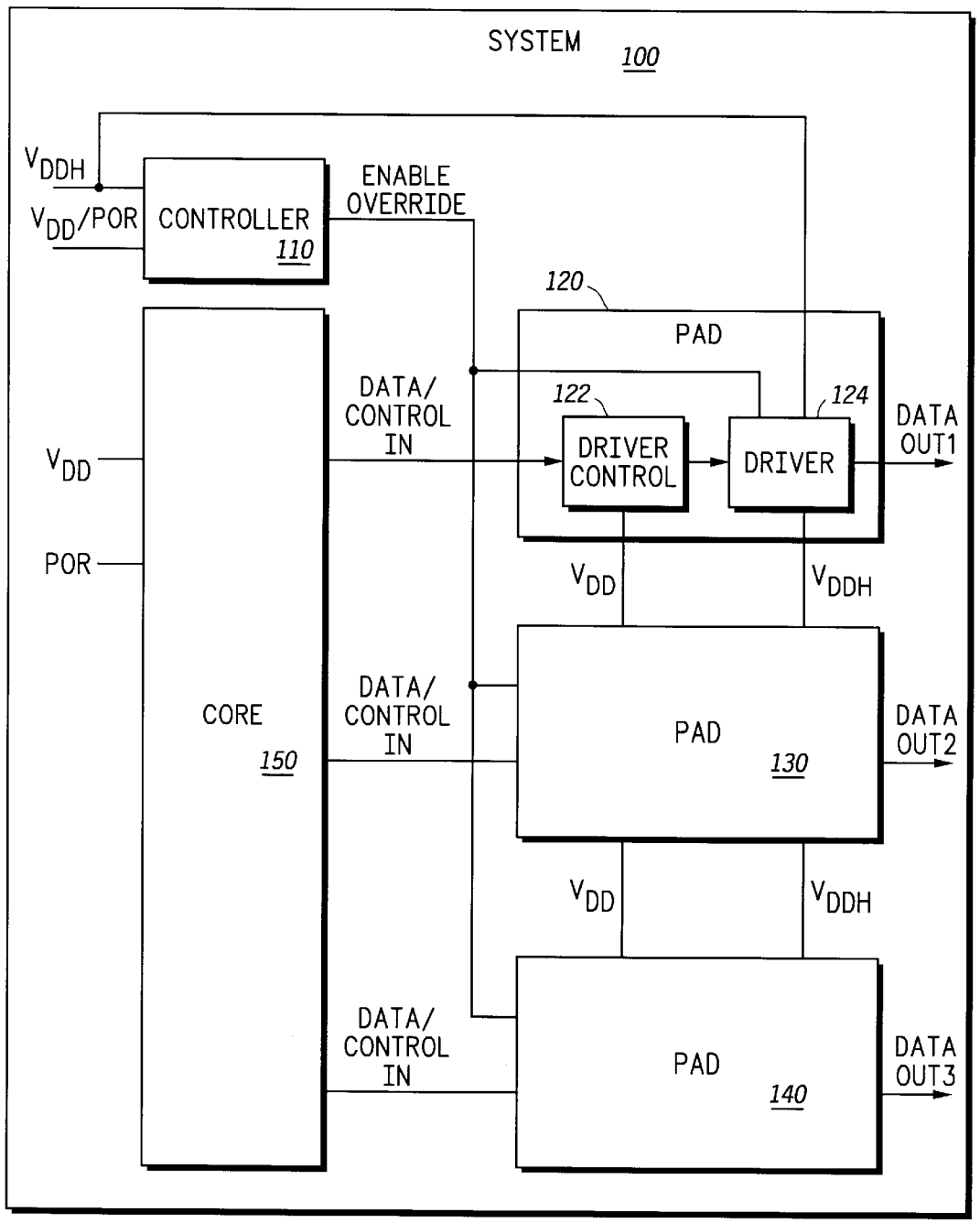
FIG. 1 is a block diagram of an exemplary data processing system that enables the disabling of output pads.

FIG. 1 is a block diagram of an exemplary data processing system 100 that enables disabling of output pads 120, 130 and 140. The data processing system 100 could be a microprocessor, a microcontroller, a wireless communication device, an embedded system, or other type of system that includes a controller 110, a core 150, and pads 120, 130, and 140. Of course, this description is only exemplary, e.g., more than three pads may be included in the system 100. The data processing system 100 is an embedded system that includes multiple power supplies for operation. In order to avoid power supplies from undesirably driving circuitry external to the data processing system 100, the controller 110 is configured to override an enable of the pads 120, 130 and 140 during power sequencing.

The controller 110 of the system 100 is illustrated as having two inputs and a single output. The first input is a VDDH input from a first power supply, while the second input is a VDD input from a second power supply. VDD may be derived (e.g., level shifted) from VDDH. For purposes of circuit stability, the second input could also be a power-on reset (POR) input that is further derived from the VDD input. The output of the controller, the enable override, is fed to the pads 120, 130, 140 and serves to override the enable signal to the pads 120, 130, and 140. The enable override is asserted when the VDDH input is substantially different from the VDD input. For example, during power-up of system 100, the difference between VDD and VDDH may be greater than any difference typically present during subsequent operation of system 100 when system 100 is processing data, possibly by more than a selected threshold amount.

In the event of substantially different inputs, the enable override is asserted to prevent the pads 120, 130, and 140 from operating until the VDD input reaches an operational level. In the event that POR is used as the second input, the assertion period of the enable override can be extended with respect to the power-up VDD to assure that the data processing system 100 has been properly initialized in preparation for data output. Of course, the controller 110, other components of system 100 and even system 100 itself could be realized as a hardware module or as a software module.

The pads 120, 130, and 140 each include a driver control 122 and a driver 124. The driver 124 is fed the enable override from the controller 110 and is also supplied the VDDH from the first power supply. The driver control 122 is supplied VDD from the second power supply and is also fed data and control input from the core 150. This data and control input is typically a low voltage that is not recognized until the enable override is off. As illustrated, each of the pads 120, 130 and 140 are configured in a similar manner and, like the controller 110, can be implemented as hardware or software modules.

The core 150 is fed at least the VDD as an input. In the event that the POR signal is also used, the core 150 is also fed the POR as an input. In this manner, the data processing system 100 is able to prevent the pads 120, 130 and 140 from driving invalid data to an external system during power sequencing. This is true of external systems containing circuitry such as a fuel injector, a relay, an RF transmitter, or other such external circuitry which would be undesirably affected by preliminary power supply signals to the pads 120, 130, and 140.

Figure 2:
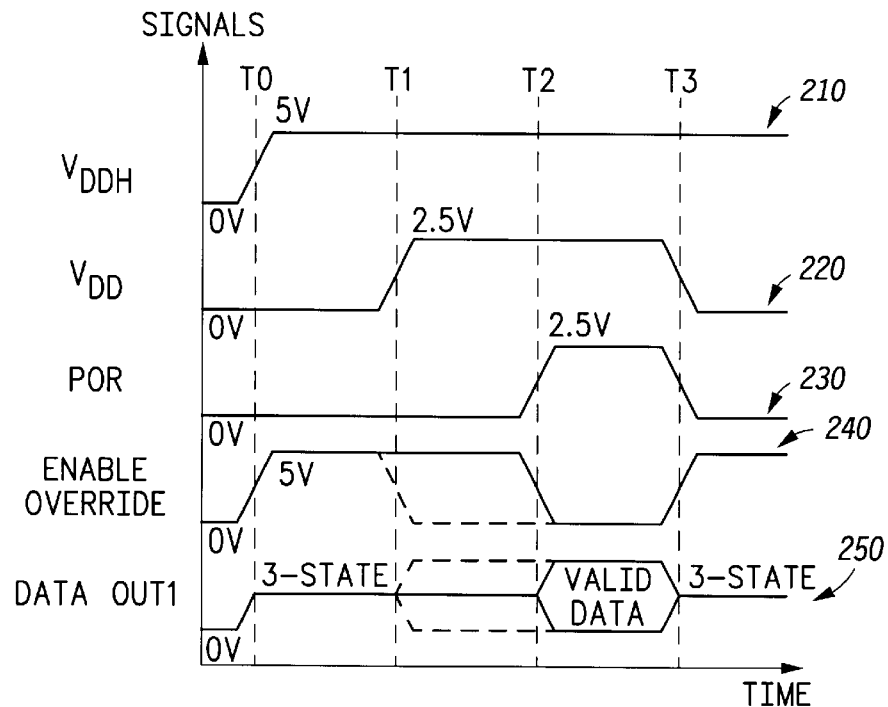
FIG. 2 is an exemplary timing diagram of some of the signals in the data processing system of FIG. 1.

FIG. 2 is an exemplary timing diagram of some of the signals in the data processing system 100. The first signal path 210 illustrates VDDH as it changes from 0 V to 5 V at time T0. Of course, this voltage change from 0 V to 5 V is exemplary and could vary depending on the data processing system 100. For example, the voltage could range from −5 V to 5 V, 0 V to 10 V or 7 V (e.g., VPP for memory programming), etc. As illustrated VDDH remains at 5 volts throughout the remainder of the time periods in the timing diagram.

The second signal path 220 illustrates VDD as it moves from 0 V to 2.5 V at time period T1. The 2.5 volts is an exemplary voltage selected to illustrate one possible operational voltage for VDD. VDD rises to this voltage as part of the normal operating procedures of the data processing system 100. The time period from T0 to T1 is variable and depends upon the circuitry that is external to the data processing system 100. The VDD remains at 2.5 volts until time period T3 where it returns to 0 volts in this example.

The third signal path 230 illustrates POR and begins at 0 volts and continues at 0 volts until time period T2 where it rises to 2.5 volts. As stated, the POR is optional and is typically further derived from the voltage VDD. The POR is essentially a safety net to assure that initialization has completed in the data processing system 100 prior to the transmission of valid data. The time period between T1 and T2 is variable and POR follows VDD to change from 0 V to 2.5 V according to information obtained through monitoring the changes in the VDD. For purposes of illustration, the POR remains at 2.5 volts through the time period between T2 and T3 before returning to 0 volts at time T3.

The fourth signal path 240 illustrates enable override, which is the output of the controller 110. The enable override becomes asserted when VDDH rises to 5 volts. Thus the enable override becomes asserted at time period T0. The enable override remains asserted until T2 when the POR rises to 2.5 volts, at which point the enable override returns to 0 volts. As illustrated, when POR drops back to 0 volts at time period T3, the enable override again rises to 5 volts. Of note, the dotted line of the fourth signal path 240 is included to illustrate the enable override if the POR is not included in the data processing system 100. As illustrated by the dotted line, the enable override drops from 5 volts to 0 volts at time period T1 which corresponds to the change in voltage from 0 volts to 2.5 volts of VDD. The dotted line representation of the enable override remains at 0 volts until time period T3 where the VDD drops back down to 0 volts. Thus, the enable override is not asserted from time period T1 to T3 rather than only between T2 and T3. Of course, circuitry could be included in the controller 110 such that the enable override's drop from 5 volts to 0 volts at time T1 in the absence of the POR is delayed so that the drop occurs somewhere between times T1 and T2. Thus, even without the POR signal, a delay can be introduced to assure that the data processing system 100 has completed initialization prior to allowing the controller 110 to discontinue disabling the enable of the pads 120, 130, and 140.

The fifth signal path 250 corresponds to the data out1 of FIG. 1 but could represent the output of any one of the pads 120, 130, 140. The data out1 is illustrated as moving from 0 volts to a 3-state condition at time period T0 when VDDH rises from 0 volts to 5 volts. The 3-state condition of the data out1 remains until time period T2 where the enable override drops to 0 volts. At this point, the data out1 begins to produce valid data for the duration of the time period that the enable override is not asserted or is at 0 volts. When the enable override becomes asserted again at time period T3, the data out1 returns to its 3-state condition and valid data is no longer transmitted.

The fifth signal path 250 also includes a dotted line that corresponds to the data processing system 100 when the POR is not included. The dotted line of the fifth signal path 250 shows that the valid data begins when the enable override drops from 5 volts to 0 volts as illustrated by the dotted line of the fourth signal path 240. Of course, without the POR, this event occurs at time period T1 when the second signal path 220 illustrates the VDD rising from 0 volts to 2.5 volts. The valid data portion of the data out1 begins at time T1 and continues until the enable override is again asserted at time period T3, at which point the data out1 returns to a 3-state condition.

Figure 3:
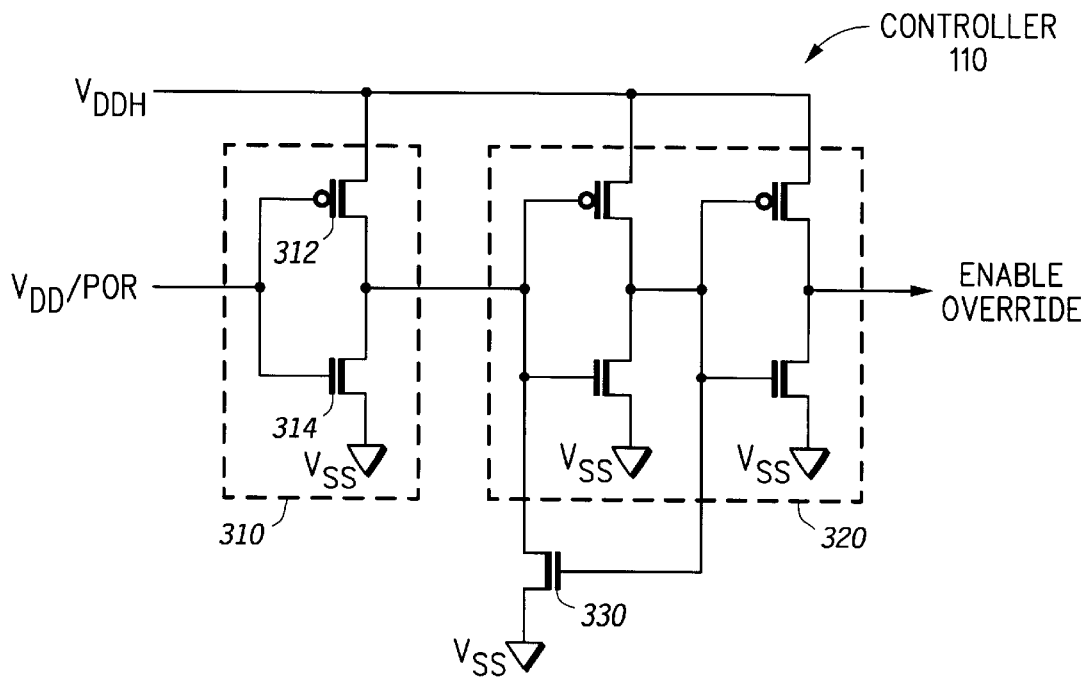
FIG. 3 is an exemplary circuit diagram of the controller of FIG. 1.

FIG. 3 is an exemplary circuit diagram of the controller 110. In this embodiment, the controller 110 includes a comparator 310 to compare the VDDH signal to the VDD or POR signal. As illustrated, the comparator 310 may be a simple inverter comparator that includes two transistors. The transistor 312 is a pull up transistor and the transistor 314 is a pull down transistor. It should be noted that the pull down transistor 314 is stronger than the pull up transistor 312 in order to create an inverter comparator according to principles of the present invention. As understood by those skilled in the art, the comparator 310 could be implemented in many ways, e.g., as illustrated in FIG. 3, with op amps, or in various other embodiments to perform the comparator function of the comparator 310.

The controller 110 also includes a buffer stage 320 which provides a built in delay to hold the enable override and assure proper operation of the data processing system 100. Again, although the buffer stage 320 is illustrated as a transistor embodiment, the buffer stage 320 could be implemented in various embodiments. Finally, the transistor 330 performs the function of a hysteresis circuit for the controller 110 and is typically required in transistor embodiments such as the embodiment illustrated in FIG. 3.

Figure 4:
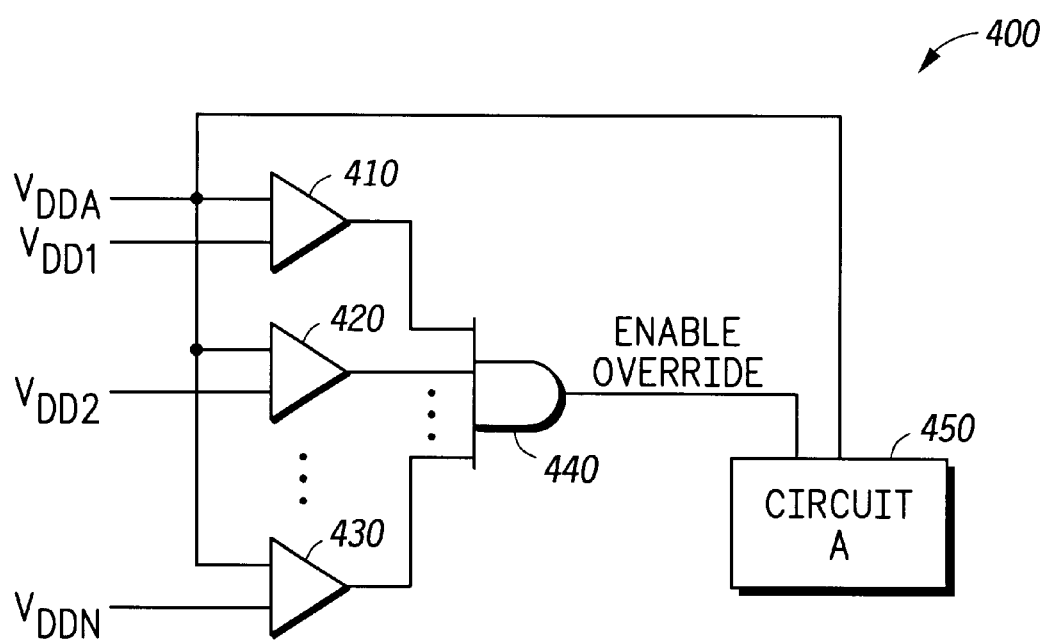
FIG. 4 illustrates an alternative exemplary data processing system wherein more than two voltages are compared in determining whether to assert enable override.

FIG. 4 illustrates an alternative exemplary data processing system 400 wherein more than two voltages are compared in determining whether to assert enable override. The data processing system 400 includes a comparator 410, a comparator 420, and a comparator 430, but can include more than these three comparators 410, 420, and 430 depending on the number of voltages which are to be compared. The comparators 410, 420, and 430 each include circuitry that enables signals such as VDDA and VDD1 to be compared and produce an output to be sent to an AND gate 440 where an enable override signal is set. The comparator 410, like the other comparators 420 and 430, is configured such that the VDDA and VDD1 do not have to be identical to assert the signal that is fed to the AND gate 440.

This multiple comparator system is desirable in the event that more than two power supplies are used in the data processing system 400. Like the data processing system 100, once all power supply signals have been properly initialized, the enable override is set such that circuit A 450 may begin operation. The circuit A 450 is similar to the pads 120, 130, and 140 of the data processing system 100 and is not operational until the enable override indicates that operation is safe. Of course, the AND gate 440 need only indicate to the circuit A 450 that the power supplies are properly initialized and circuitry such as a NAND gate or other combinatorial module could be implemented in a related embodiment.

System 100 may be any type of data processing system. For example, system 100 and/or the components thereof may be a silicon-based (or the like) system such as an integrated circuit, a microprocessor, or a microcontroller. System 100 may be a wireless communication device or a system board or component thereof, or a computer system, a system board or peripheral device thereof System 100 may be an embedded system.

System 100 and/or components thereof may be an integrated circuit design or module, including a software model of an integrated circuit, or a software model representing any of the above or other types of data processing systems. For example, controller 110 and pads 120, 130 and 140 may be software modules (e.g., of a microprocessor soft core) for representing corresponding hardware modules 110, 120, 130 and 140 prior to the manufacture of such hardware modules.

System 100 may be or include computer-readable media for storing and/or transferring such designs, modules or models of system 100 and/or components thereof. Computer-readable media include data storage media and/or data transmission media. Exemplary data storage media include magnetic storage media (e.g., disk and tape storage media); optical storage media such as compact disk media (e.g., CD-ROM, CD-R, etc.) and digital video disk media; nonvolatile memory storage media including semiconductor-based memory units; etc. Exemplary data transmission media include computer networks, point-to-point telecommunication equipment, and carrier wave transmission media, or components thereof, just to name a few. Other new and various types of computer-readable media may be used to store and/or transmit the designs, modules or models discussed herein.

The above descriptions are intended to describe at least one embodiment of the invention. The above descriptions are not intended to define the scope of the invention. Rather, the scope of the invention is defined in the claims below. Thus, other embodiments of the invention include other variations, modifications, additions, and/or improvements to the above description.

The transistors described and shown herein (whether bipolar, field effect, etc.) may be conceptualized as having a control terminal which controls the flow of current between a first current handling terminal and a second current handling terminal. An appropriate condition on the control terminal causes a current to flow from/to the first current handling terminal and to/from the second current handling terminal.

For example, in a bipolar NPN transistor, the first current handling terminal is the collector, the control terminal is the base, and the second current handling terminal is the emitter. A sufficient current into the base causes a collector-to-emitter current to flow. In a bipolar PNP transistor, the first current handling terminal is the emitter, the control terminal is the base, and the second current handling terminal is the collector. A current flowing between the base and emitter causes an emitter-to-collector current to flow.

Also, although field effect transistors (FETs) are frequently discussed as having a drain, a gate, and a source, in most such devices the drain is interchangeable with the source. This is because the layout and semiconductor processing of the transistor is frequently symmetrical. For an n-channel FET, the current handling terminal normally residing at the higher voltage is customarily called the drain. The current handling terminal normally residing at the lower voltage is customarily called the source. A sufficient voltage on the gate (relative to the source voltage) causes a current to therefore flow from the drain to the source. The source voltage referred to in n-channel FET device equations merely refers to which drain or source terminal has the lower voltage at any given point in time. For example, the "source" of the n-channel device of a bi-directional CMOS transfer gate depends on which side of the transfer gate is at the lower voltage. To reflect this symmetry of most n-channel FET devices, the control terminal may be deemed the gate, the first current handling terminal may be termed the "drain/source", and the second current handling terminal may be termed the "source/drain". Such a description is equally valid for a p-channel FET device, since the polarity between drain and source voltages, and the direction of current flow between drain and source, is not implied by such terminology. Alternatively, one current-handling terminal may be arbitrarily deemed the "drain" and the other deemed the "source", with an implicit understanding that the two are not distinct, but interchangeable.

Insulated gate FETs (IGFETs) are commonly referred to as MOSFET devices (which literally is an acronym for "Metal-Oxide-Semiconductor Field Effect Transistor"), even though the gate material may be polysilicon or some material other than metal, and the dielectric may be oxynitride, nitride, or some material other than an oxide. The use of such historical legacy terms as MOSFET should not be interpreted to literally specify a metal gate FET having an oxide dielectric.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." As used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended, such an intent will be explicitly recited in the claim, and in the absence of such recitation no such limitation is present or intended. For example, in the claims below, when a claim element is described as having "one" feature, it is intended that that element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that that element not be limited to one and only one of the feature described. Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. In a system including first and second power supply signals, a module for controlling an output signal, the module comprising:
   a comparator coupled to receive and compare the first power supply signal and a second signal and coupled to provide a control signal responsive to receiving the first power supply signal and the second signal; and
   a pad module coupled to receive the first power supply signal and the control signal and coupled to provide an output signal responsive to receiving the first power supply signal, the output signal of the pad module being disabled when the control signal has a first value.

2. The module of claim 1 wherein the control signal has the first value when the first power supply signal differs from the second signal by more than a threshold.

3. The module of claim 1 wherein the second signal is the second power supply signal.

4. The module of claim 1 further comprising a delay module coupled to receive the second power supply signal and coupled to provide the second signal.

5. The module of claim 1 wherein the comparator is an inverter comparator coupled to receive the first power supply signal at a power input and the second signal at a data input.

6. The module of claim 5 wherein the comparator comprises:
   a pull-up module coupled to the power input and the data input; and
   a pull-down module coupled to the data input.

7. The module of claim 6 wherein the pull-down module includes a pull-down transistor and the pull-up module includes a pull-up transistor, wherein the pull-down transistor is stronger than the pull-up transistor.

8. The module of claim 1 wherein
   the first power supply signal has a first operational value;
   the second power supply signal has a second operational value; and
   the first operational value is higher than the second operational value.

9. The module of claim 1 wherein the second power supply signal is level shifted from the first power supply signal.

10. A power-on disable module for an apparatus having multiple power supply signals, the power-on disable module comprising;
    a controller coupled to receive a plurality of power supply signals including at least a first power supply signal, a second power supply signal, and a third power supply signal and coupled to provide an enable override signal depending on a comparison of the power supply signals.

11. A data processing system comprising:
    first and second power supply signals;
    a controller coupled to receive the first and second power supply signals and coupled to provide a control signal depending on a value of the first power supply signal in relation to a value of the second power supply signal;
    an output buffer coupled to receive the first power supply signal and the control signal, the output buffer being disabled by the control signal when the control signal has a first value;
    a data processing module coupled to receive the second power supply signal and coupled to provide a data signal to the output buffer.

12. A data processing system comprising:
    first and second power supply signals;
    a controller coupled to receive the first and second power supply signals and coupled to provide a control signal depending on a value of the first power supply signal in relation to a value of the second power supply signal;
    wherein the data processing system is one of the group consisting of a microprocessor, a microcontroller, a circuit board, an embedded system, a wireless communications device, and a software model of a data processing hardware design.

13. A data processing system of claim 12 wherein;
the control signal has a first value upon power-on of the data processing system, the first value disabling portions of the data processing system; and
the control signal has a second value when a number of the power supply signals have respective final operational values, the second value not disabling the portions of the data processing system.

14. A data processing system of claim 12 wherein the controller comprises:
a comparator coupled to receive the first and second power supply signals and coupled to provide the control signal.

15. The power-on disable module of claim 14 wherein
the first comparator performs a first weighted comparison of the first and second power supply signals and provides the first comparison signal indicating that the first power supply signal is within a threshold of the second power supply signal responsive to receiving the first and second power supply signals;
the second comparator performs a second weighted comparison of the first and third power supply signals and provides the second comparison signal indicating that the first power supply signal is within a threshold of the third power supply signal responsive to receiving the first and third power supply signals; and
the combinatorial logic module provides the enable override signal having a disable value responsive to receiving the first comparison signal indicating that the first power supply signal is within a threshold of the second power supply signal and the second comparison signal indicating that the first power supply signal is within a threshold of the third power supply signal.

16. A data processing system of claim 11 wherein the data processing system is one of the group consisting of the following: a microprocessor chip, a microcontroller unit, a wireless communications device, and a computer readable medium.

17. A data processing system of claim 11 wherein the data processing system is one of the group consisting of the following: an integrated circuit, a wireless communications device, and a computer readable medium.

18. A data processing system of claim 12, wherein the data processing system is one of the group consisting of a microprocessor, a microcontroller, an embedded system, and a wireless communications device.

19. The data processing system of claim 12 further comprising:
an output buffer coupled to receive the first power supply signal and the control signal, the output buffer being disabled by the control signal when the control signal has a first value.

20. The data processing system of claim 11, wherein the controller provides the control signal having the first value when the first power supply signal differs from the second power supply signal by a threshold.

21. A circuit for controlling an output signal, the circuit comprising:
a control circuit coupled to receive a first power supply signal and a power-on reset signal derived from a second power supply signal, the control circuit further coupled to provide a control signal depending on a comparison of the first power supply signal and the power-on reset signal.

22. The circuit of claim 21 further comprising:
an output buffer coupled to receive the first power supply signal and the control signal, the output buffer being disabled by the control signal when the control signal has a first value.

23. The circuit of claim 22, wherein the control circuit provides the control signal having the first value when the first power supply signal differs from the power-on reset signal by a threshold.

24. The circuit of claim 23, wherein the first power supply signal has an operational voltage higher than an operational voltage of the second power supply signal.

25. A data processing system of claim 11 wherein:
the first power supply signal has an operational voltage greater than an operational voltage of the second power supply signal.

* * * * *

UNITED STATES PATENT AND TRADEMARK OFFICE
CERTIFICATE OF CORRECTION

| | |
|---|---|
| PATENT NO. | : 6,646,844 B1 |
| APPLICATION NO. | : 09/461909 |
| DATED | : November 11, 1999 |
| INVENTOR(S) | : Lloyd P. Matthews |

It is certified that error appears in the above-identified patent and that said Letters Patent is hereby corrected as shown below:

In line 2 of claim 1 in column 8, delete "value." and replace with --value; wherein the second signal is a power-on reset signal derived from a second power supply signal.--

In line 11 of claim 5 in column 8, delete "The module of claim 1" and replace with -- In a system including first and second power supply signals, a module for controlling an output signal, the module comprising:
  a comparator coupled to receive and compare the first power supply signal and
    a second signal and coupled to provide a control signal responsive to
    receiving the first power supply signal and the second signal; and
  a pad module coupled to receive the first power supply signal and the control
    signal and coupled to provide an output signal responsive to receiving
    the first power supply signal, the output signal of the pad module being
    disabled when the control signal has a first value;--

In line 24 of claim 8 in column 8, delete "The module of claim 1" and replace with -- In a system including first and second power supply signals, a module for controlling an output signal, the module comprising:
  a comparator coupled to receive and compare the first power supply signal and
    a second signal and coupled to provide a control signal responsive to
    receiving the first power supply signal and the second signal; and
  a pad module coupled to receive the first power supply signal and the control
    signal and coupled to provide an output signal responsive to receiving
    the first power supply signal, the output signal of the pad module being
    disabled when the control signal has a first value;--

In line 26 of claim 8 in column 8, delete "the second power", and replace with --wherein the second power--

In line 28 of claim 8 in column 8, delete "the first operational", and replace with --wherein the first operational--

In line 30 of claim 9 in column 8, delete "The module of claim 1", and replace with -- In a system including first and second power supply signals, a module for controlling an output signal, the module comprising:
a comparator coupled to receive and compare the first power supply signal and
  a second signal and coupled to provide a control signal responsive to
  receiving the first power supply signal and the second signal; and
  a pad module coupled to receive the first power supply signal and the control
    signal and coupled to provide an output signal responsive to receiving
    the first power supply signal, the output signal of the pad module being
    disabled when the control signal has a first value;--

UNITED STATES PATENT AND TRADEMARK OFFICE
CERTIFICATE OF CORRECTION

PATENT NO. : 6,646,844 B1
APPLICATION NO. : 09/461909
DATED : November 11, 1999
INVENTOR(S) : Lloyd P. Matthews It is certified that error appears in the above-identified patent and that said Letters Patent is hereby corrected as shown below:

In line 41 of claim 10 in column 8, delete "nals." and replace with -- nals; wherein the controller further comprises:
 a first comparator coupled to receive the first and second power supply signals and coupled to provide a first comparison signal;
 a second comparator coupled to receive the first and third power supply signals and coupeld to provide a second comparison signal; and
 a combinatorial logic module coupled to receive the first and second comparison signals and coupledc to provide the enable override signal.--

In line 14 of Claim 15 in column 9, delete "claim 14" and replace with -- claim 10--

Signed and Sealed this

Seventeenth Day of July, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,646,844 B1 | |
| APPLICATION NO. | : 09/461909 | |
| DATED | : November 11, 2003 | |
| INVENTOR(S) | : Lloyd P. Matthews | |

It is certified that error appears in the above-identified patent and that said Letters Patent is hereby corrected as shown below:

In line 2 of claim 1 in column 8, delete "value." and replace with --value; wherein the second signal is a power-on reset signal derived from a second power supply signal.--

In line 11 of claim 5 in column 8, delete "The module of claim 1" and replace with -- In a system including first and second power supply signals, a module for controlling an output signal, the module comprising:
       a comparator coupled to receive and compare the first power supply signal and
            a second signal and coupled to provide a control signal responsive to
            receiving the first power supply signal and the second signal; and
       a pad module coupled to receive the first power supply signal and the control
            signal and coupled to provide an output signal responsive to receiving
            the first power supply signal, the output signal of the pad module being
            disabled when the control signal has a first value;--

In line 24 of claim 8 in column 8, delete "The module of claim 1" and replace with -- In a system including first and second power supply signals, a module for controlling an output signal, the module comprising:
       a comparator coupled to receive and compare the first power supply signal and
            a second signal and coupled to provide a control signal responsive to
            receiving the first power supply signal and the second signal; and
       a pad module coupled to receive the first power supply signal and the control
            signal and coupled to provide an output signal responsive to receiving
            the first power supply signal, the output signal of the pad module being
            disabled when the control signal has a first value;--

In line 26 of claim 8 in column 8, delete "the second power", and replace with --wherein the second power--

In line 28 of claim 8 in column 8, delete "the first operational", and replace with --wherein the first operational--

In line 30 of claim 9 in column 8, delete "The module of claim 1", and replace with -- In a system including first and second power supply signals, a module for controlling an output signal, the module comprising:
a comparator coupled to receive and compare the first power supply signal and
        a second signal and coupled to provide a control signal responsive to
        receiving the first power supply signal and the second signal; and
        a pad module coupled to receive the first power supply signal and the control
            signal and coupled to provide an output signal responsive to receiving
            the first power supply signal, the output signal of the pad module being
            disabled when the control signal has a first value;--

UNITED STATES PATENT AND TRADEMARK OFFICE
CERTIFICATE OF CORRECTION

| | | |
|---|---|---|
| PATENT NO. | : 6,646,844 B1 | |
| APPLICATION NO. | : 09/461909 | |
| DATED | : November 11, 2003 | |
| INVENTOR(S) | : Lloyd P. Matthews | |

It is certified that error appears in the above-identified patent and that said Letters Patent is hereby corrected as shown below:

In line 41 of claim 10 in column 8, delete "nals." and replace with -- nals; wherein the
    controller further comprises:
        a first comparator coupled to receive the first and second power supply
            signals and coupled to provide a first comparison signal;
        a second comparator coupled to receive the first and third power supply
            signals and coupeld to provide a second comparison signal; and
        a combinatorial logic module coupled to receive the first and second
            comparison signals and coupledc to provide the enable override
            signal.--

In line 14 of Claim 15 in column 9, delete "claim 14" and replace with -- claim 10--

This certificate supersedes Certificate of Correction issued July 17, 2007.

Signed and Sealed this

Fourth Day of September, 2007

JON W. DUDAS
*Director of the United States Patent and Trademark Office*